United States Patent
Pleasant et al.

[11] Patent Number: 5,916,603
[45] Date of Patent: Jun. 29, 1999

[54] MOLD BASE KIT WITH PLATE ALIGNMENT SYSTEM INCLUDING GUIDE DOWELS

[75] Inventors: Ronald E. Pleasant, Kenton; Mark A. Morris, Bellefontaine, both of Ohio

[73] Assignee: Pleasant Precision, Inc., Kenton, Ohio

[21] Appl. No.: 08/874,999

[22] Filed: Jun. 13, 1997

[51] Int. Cl.⁶ .................................................. B29C 45/26
[52] U.S. Cl. .......................... 425/182; 164/341; 164/342; 425/190; 425/192 R; 425/DIG. 47
[58] Field of Search ..................... 425/182, 190, 425/192 R, DIG. 47, 441, 444; 164/339, 341, 342

[56] References Cited

U.S. PATENT DOCUMENTS

| | | | |
|---|---|---|---|
| 3,749,537 | 7/1973 | Schriever | 425/444 |
| 4,744,741 | 5/1988 | Glover et al. | 425/DIG. 47 |
| 4,828,479 | 5/1989 | Pleasant | 425/192 R |
| 4,959,002 | 9/1990 | Pleasant | 425/192 R |

*Primary Examiner*—Tim Heitbrink
*Attorney, Agent, or Firm*—Roger S. Dybvig

[57] ABSTRACT

A mold base kit including plural plates having alignment bores for receiving guide dowels for accurately aligning the plates with respect to one another as a mold frame is assembled from the kit. Each guide dowel includes a hollow, cylindrical sleeve sized to fit snugly in the alignment bores of adjacent, abutting plates and also includes an abutment member extending radially outwardly of the guide dowel sleeve intermediate its ends which prevents the guide dowel from moving a substantial distance along an alignment bore. The abutment member may be formed by a circular piece of spring wire which extends through an arc of more than 180° around the outside of the dowel sleeve, and preferably approximately 270° around the sleeve. Because the retainer clip extends less than completely around the sleeve, its ends can readily be spread apart for assembly of the retainer clip onto the sleeve.

16 Claims, 1 Drawing Sheet

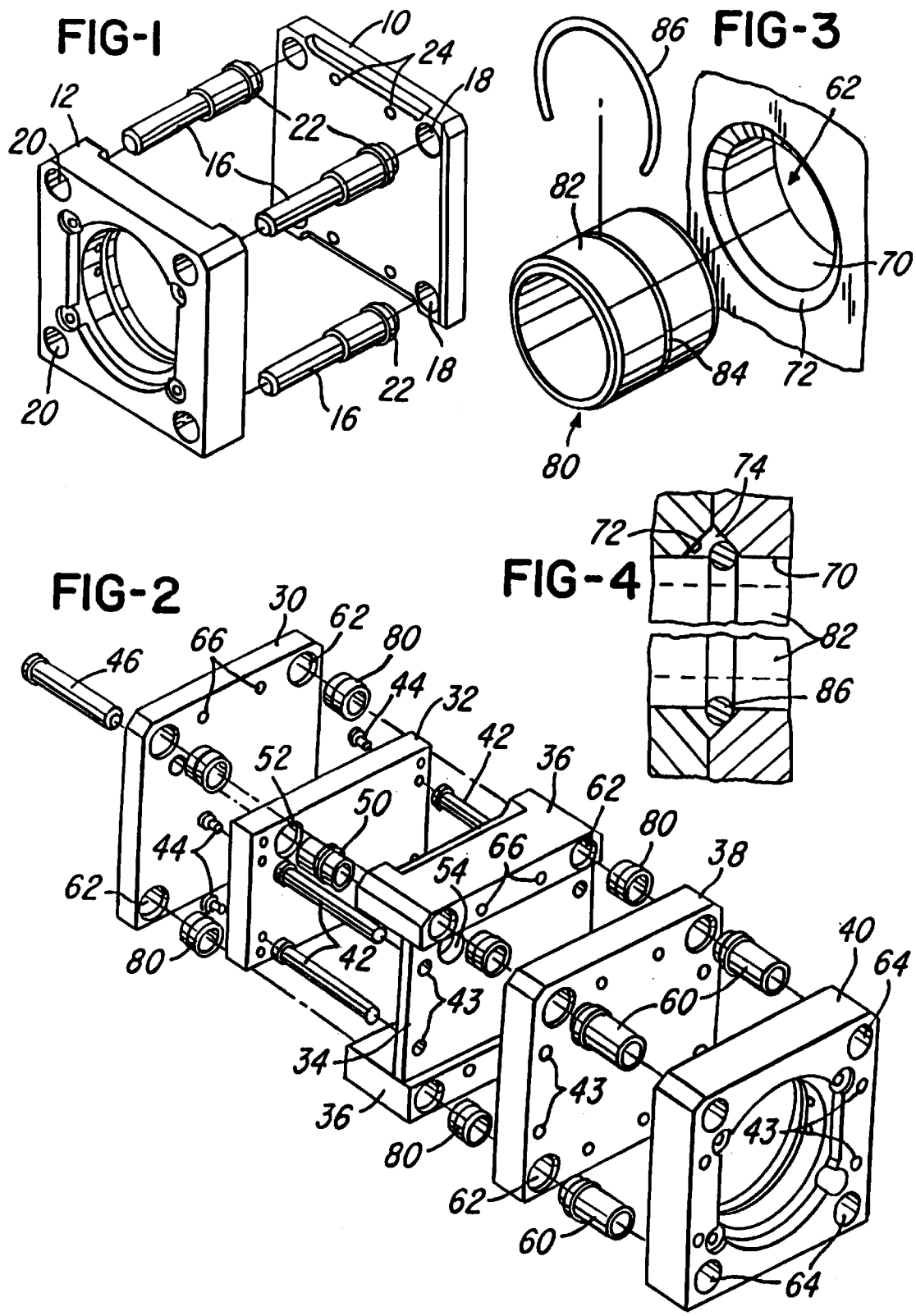

MOLD BASE KIT WITH PLATE ALIGNMENT SYSTEM INCLUDING GUIDE DOWELS

INCORPORATION BY REFERENCE

The disclosures of U.S. Pat. Nos. 4,828,479, granted May 9, 1989, and 4,959,002, granted Sep. 25, 1990, are hereby incorporated by reference herein.

FIELD OF THE INVENTION

This invention relates to a mold base kit with a plate alignment system and guide dowel assemblies for use therewith. The plate alignment system is primarily intended for use in manufacturing and assembling mold frames or bases used in machines for injection molding plastic workpieces, but the mold frames or bases could be used in other fields, such as die casting and rubber molding.

BACKGROUND OF THE INVENTION

Kits for manufacturing and assembling mold frames or bases typically include several pairs of plates which a craftsman stacks side-by-side on a workbench. Usually there are one or more pairs of plates that abut one another. During assembly, the abutting plates are held in alignment by dowel pins, which may be either hollow or solid that are received by aligned bores in the two plates. Assembly of the two plates can be difficult because the dowel pins may be driven completely into the first plate when the second plate is moved into engagement with the first plate. In addition, bores for the dowel pins, usually two in each plate, must be drilled through the two plates.

The practice has developed of constructing mold bases from square or rectangular plates of uniform face dimensions (i.e., width and height) and with bores in the four corners of the plates for receiving guide or leader pins that maintain the alignment of the plates. All of the guide or leader pin bores are in the same, predetermined location.

For ease of assembly, dowel pins are provided for aligning at least some of the plates used in the mold base. In some cases, dowel pin-receiving bores are machined in the plates for receiving the dowel pins. In other cases, the dowel pins are hollow to receive the leader pins and extend through aligned leader pin bores in several plates. The dowel pins often have a uniform outer diameter along their length, but there are some mold constructions in which the dowel pins have a larger outer diameter portion that is received in a pocket in one of the plates formed by counterboring the plate.

When assembling a mold base with the use of dowel pins, it is a common occurrence to accidentally push the dowel pin into a plate or series of plates due to a slight misalignment between two plates that are being assembled together. This problem can be avoided by using a dowel pin having a larger outer diameter portion which is lodged in counterbore of one of the plates. However, such dowel pins are relatively expensive to manufacture and an extra machining operation is required to form the counterbore.

SUMMARY OF THE INVENTION

An object of this invention is to provide a mold base kit which can be easily and quickly assembled. The kit includes plural plates and guide dowels which accurately align the plates with respect to one another as a mold frame is assembled from the kit. At least some of the plates have leader pin-receiving, or alignment, bores in their corners which have relatively large chamfered surfaces at both ends. Any one of these plates can be aligned and mounted in assembled, face-to-face abutting relation with at least another one of these plates using guide dowels made in accordance with this invention that extend into mutually-aligned alignment bores of both plates. The guide dowels are of uniform construction and are usable with any of the plates having the alignment bores.

Each guide dowel of this invention comprises a hollow, cylindrical sleeve or tube sized to fit snugly in the mutually-aligned leader pin-receiving bores of adjacent, abutting plates and further comprises an abutment member extending radially outwardly of the guide dowel sleeve intermediate its ends. In use, guide dowels are inserted into the alignment bores of one of the two plates and the other plate is then moved to have its alignment bores receive the guide dowels. Using this arrangement, the plates that make up a mold frame can be quickly assembled in aligned relationship with the guide dowels securely located in the aligned bores. Because the abutment member has a diameter too large to enter the bore of either plate, it is not possible for the craftsman assembling a mold frame to accidentally push the guide dowel completely into one of the bores and lose the alignment between the two plates as they are being assembled together. After a mold frame is completely assembled using a kit of this invention, the abutment member prevents each guide dowel from moving out of either one of the bores in which it is lodged.

The abutment member preferably comprises a circular retainer clip received in a circular groove extending around the guide dowel sleeve. The retainer clip preferably comprises a piece of spring wire which extends through an arc of more than 180° around the outside of the dowel sleeve, and preferably approximately 270° around the sleeve. Because the retainer clip extends less than completely around the sleeve, its ends can readily be spread apart for assembly of the retainer clip onto the sleeve.

Another object of this invention is to provide improved plates, as described above, usable in a mold frame kit.

Yet another object of this invention is to provide guide dowels, as described above, for aligning pairs of adjacent plates, such as plates forming parts of mold frames.

Still another object of this invention is to provide an injection mold frame that includes pairs of plates with one or more guide dowels of this invention lodged in them.

Other objects and advantages will become apparent from the following description and the accompanying drawings.

BRIEF DESCRIPTION OF THE DRAWINGS

FIG. 1 is an exploded, diagrammatic, isometric view of parts of a mold kit made in accordance with this invention used to form the injection side of a mold frame.

FIG. 2 is an exploded, diagrammatic, isometric view of parts of a mold kit made in accordance with this invention used to form the ejection side or half of a mold frame.

FIG. 3 is an enlarged, fragmentary, exploded, diagrammatic, isometric view of a guide dowel and one of the plates with which the guide dowel may be assembled, the guide dowel and the plate being parts of the mold kit shown in FIGS. 1 and 2.

FIG. 4 is an enlarged, fragmentary, cross-sectional view of a guide dowel and a pair of plates, which are parts of the mold kit shown in FIGS. 1 and 2, shown in assembled relation.

DETAILED DESCRIPTION

FIG. 1 shows parts of a mold base kit in accordance with this invention used to form the injection side of a mold base for producing plastic parts. The parts illustrated in FIG. 1 include a rectangular top clamp plate 10 and a rectangular "A" or cavity plate 12 of a mold base. The particular "A" plate 12 illustrated in FIG. 1 is constructed to receive a mold insert of the type shown in U.S. Pat. No. 4,828,479, but the "A" plate could be a solid plate (not shown) which is appropriately machined to form the cavity plate of a mold base.

The mold kit of this invention further comprises four leader pins 16 (only three of which are seen in FIG. 1) which are adapted to be piloted into bores 18 at the corners of the top clamp plate 10 and extend through bores 20 at the corners of the "A" plate 12. The leader pins 16 have larger diameter portions 22 which are adapted to be trapped within counterbores (not shown) on the back face of the "A" plate 12.

The "A" plate is assembled in face-to-face relationship with the top clamp plate 10 by means of screws (not shown) that extend through holes 24 in the top clamp plate 10 and are threaded into tapped holes (not shown) opening to the back face of the "A" plate 12. of course, a suitable sprue opening (not shown) would be provided in the top clamp plate 10 to enable delivery of molten plastic to the cavity (not shown) of the ejection side of the mold base.

Those familiar with the art will recognize that the components of the mold kit shown in FIG. 1 could be used to produce a simple injection side of a mold base. More complicated injection sides, which could include additional plates, are often employed for various purposes.

FIG. 2 shows additional parts of a mold kit in accordance with this invention, which are illustrated in alignment as they would be assembled to form a simple ejection side of a mold base. The parts shown in FIG. 2 comprise plural rectangular plates, namely, a bottom clamp plate 30, an ejection plate 32, an ejector retainer plate 34, a pair of ejector guide rails 36, a "B" plate support plate 38, and a "B" plate 40. The particular "B" plate 40 illustrated in FIG. 2 is of the type shown in the aforementioned U.S. Pat. No. 4,828,479, and is adapted to receive a mold insert (not shown herein) to form the mold cavity but, as in the case of the "A" plate 10, the "B" plate could be constructed as a solid plate which does not require an insert.

During the assembly of a mold base using the mold base kit of this invention, the ejection plate 32 and the ejector retaining plate 34 are bolted to one another and confine between them the enlarged ends of four ejector return pins 42 and the enlarged ends of suitable ejection pins (not shown) which are machined and located as determined by the mold maker to enable them to eject a freshly molded part As is evident, the ejector return pins 42 extend through aligned apertures 43 in the ejector retainer plate 34, the "B" plate support plate 38 and the "B" plate 40. Rest buttons 44 that are adapted to be press fit into apertures in the ejection plate 32 are provided, as is conventional, to maintain a spacing between the ejection plate 32, when it is retracted, and the bottom clamp plate 30.

When a mold base is assembled using the kit of this invention, two or more ejector guide pins 46 (only one of which is shown herein) extend through bores 48 in the bottom clamp plate 30 and through ejector guide pin bushings 50 which extends through aligned bores 52 and 54 in the ejection plate 32 and the ejection retainer plate 34, respectively The bores 52 in the ejection plate 32 have counterbores for housing enlarged diameter portions of the ejector guide pin bushings 50.

A set of four leader pin bushings 60 is provided (only three of which are shown herein), each bushing 60 being piloted into an alignment bore 62 in the "B" plate support plate 38 and extended into a leader pin alignment bore 64 in the "B" plate 40. A large diameter section 66 of each bushing 60 is housed within a counterbore (not shown) in the rear face of the "B" plate 40. As is conventional, during a molding cycle, the leader pin bushings 60 are adapted to slidably receive the leader pins 16 to maintain registry between the "A" plate 12 and the "B" plate 40.

To enable a rapid assembly and ensure exact alignment of the bottom clamp plate 30 and the plates forming the guide rails 36, as well as any other plates that may be similarly affixed to the "B" plate 40, all of such plates are provided with alignment bores 62 at the corners thereof, the alignment bores 62 being so located that the alignment bores 62 of one plate can be aligned with the alignment bores 62 of all of the other plates.

With reference to FIGS. 3 and 4, for reasons which will become apparent, each of the alignment bores 62 has a center portion 70 having a first, primary diameter and end sections 72 comprising conical, significantly chamfered surfaces which may be formed by countersinking. As used herein and in the claims that follows, "a significant chamfered surface" is one that is substantially larger in diameter and depth than a chamfered surface formed merely to break an edge defining the end of a bore and is sufficiently large that two such significant chamfered surfaces can be located in mutually confronting relationship, with their outer margins abutting one another and define between them an empty pocket, such as the pocket designated 74 in FIG. 4, of sufficient size to receive and confine an abutment member between them which is on the order of 0.060 to 0.070 inch wide. In actual practice, a bore may be chamfered to a depth of approximately 0.020 to 0.030 inch for purposes of avoiding an unduly sharp edge. In contrast, in a plate having a bore having a primary diameter of approximately 1.815 inch, an acceptable significant chamfer for purposes of this invention would be a 45° chamfer which is 0.060 inch deep. Of course, there is a wide range of chamfer sizes that could be used and the actual size will depend upon the primary diameter of the bore and the size of the abutment member.

To reduce the difficulty of aligning and assembling the several plates which do not have bushings, such as the ejection guide pin bushings 50 and the leader pin bushings 60, and to enhance the overall rigidity of an assembled mold base, the mold base kit of this invention is provided with several guide dowels 80 used to guide the plates into exact alignment and to hold them together until the assembly of a mold half is completed.

With reference to FIGS. 2, 3 and 4, each guide dowel 80 preferably comprises a hollow, cylindrical tube or sleeve 82 having a uniform inside diameter and a uniform outside diameter except for a circular groove 84 completely encircling the sleeve 82 centrally between its ends. The inside diameter of the sleeve 82 is preferably sufficiently large to permit a leader pin to be extended therethrough with a clearance. The outside diameter of the guide dowel sleeve 72 is such that it is snugly received within an alignment bore 62. A retainer clip 86 is received in the groove 84 and extends radially beyond the outer diameter of the sleeve 82. The retainer clip 86 preferably comprises a piece of spring wire which extends through an arc of more than 180° around the outside of the sleeve 82, and preferably approximately 270° around the sleeve 82. The depth of the clip-receiving groove 84 is less than the diameter of the wire that forms the retainer clip 86 so that the retainer clip 86 necessarily has an outer diameter greater than the sleeve 82 when the guide dowel 80 is assembled. Because the retainer clip 86 extends less than completely around the sleeve 82, its ends can readily be spread apart for assembly of the retainer clip 86 onto the sleeve 72.

The retainer clip 86 forms the abutment member mentioned above that, as shown in FIG. 4, is confined within the pocket 74 after a pair of plates and guide dowels 80 have been assembled. It will be noted that the retainer clip 86 prevents the guide dowel from moving any significant distance in one direction or the other because the retainer clip acts as an abutment which is stopped against one of the chamfered surfaces and cannot enter into the center section 70 of the bore 62.

In many cases, such as in the case of the ejection guide rails 36, a plate will be sandwiched between two other plates, in which event, there should be two guide dowels 80 extended into the same alignment bore 62 from opposite sides. Accordingly, the overall length of a guide dowel 80 should be somewhat less than the thickness of the thinnest plates with which the guide dowel is to be used.

During assembly of an ejection side of a mold base using the components shown in FIG. 2, four screws (not shown) are extended through small bores 66 in each of the bottom clamp plate 30, the ejector guide rails 36 and the support plate 38. The screws terminate in threaded engagement with tapped holes (not shown) in the rear face of the "B" plate 40.

Those familiar with the art will recognize that the components of the mold kit shown in FIG. 2 could be used to produce a simple ejection side of a mold base. More complicated ejection sides, which could include additional plates, are often employed for various purposes, as in the case of the injection side.

The manner in which a mold base constructed with the components of FIGS. 1 and 2 is used to produce molded plastic parts will be evident to those familiar with the art, and is not described herein.

The guide dowels 80, the leader pin bushings 60, and all of the plates forming the mold kit of this invention are pre-machined to enable them to be quickly assembled so that the mold maker who uses the kit need only be concerned with chase work and detail machining. Several plates of different thicknesses can be provided with the kit, at the choice of the kit manufacturer or the mold manufacturer buying the plates, but each plate, except for those that may be dedicated to a specific purpose, such as the "A" plate and the "B" plate, is preferably constructed as described above with significant chamfered surfaces at each end of each of the through bores used for alignment of the plates. Accordingly, various plate combinations can be configured by changing the placement of the various pins, bushings, guide dowels and plates.

This invention is preferably practiced with mold bases having the "four point alignment" provided by the use of four leader pins located at the corners of the top clamp plate 10, because such bases are well known to have a sturdy construction However, it will be recognized that aspects of this invention could be used to produce mold bases having a different construction.

It will be noticed that the guided ejection mechanism illustrated in FIG. 2 is not removable with the mold insert which would be connected to the "B" plate. The mold base indicated in FIGS. 1 and 2 is intended to be a dedicated system and would not utilize removable inserts, such as shown in U.S. Patent No. 4,828,479. However, it is evident that mold base kits utilizing the guide dowels and plates shown and described herein could be used to manufacture mold bases which have inserts which are intended to be removed and replaced.

Although the presently preferred embodiment of this invention have been described, it will be understood that within the purview of the invention various changes may be made within the scope of the following claims.

Having thus described our invention, we claim:

1. A mold base kit comprising plural plates having leader pin-receiving bores extending therethrough and plural guide dowels; each of said guide dowels comprising a hollow, cylindrical guide dowel sleeve sized to be snugly received within an aligned pair of said bores and having first and second ends, a circumferentially-extending groove encircling said guide dowel sleeve intermediate said first and second ends, and a circular abutment member received within said groove and partly projecting radially outwardly of said groove.

2. The kit of claim 1 wherein said sleeve has an overall length which is less than the thickness of any of said plates.

3. The mold base kit of claim 1 wherein said groove is located centrally between said first and second ends.

4. A mold base kit comprising plural plates having leader pin-receiving bores extending therethrough and plural guide dowels, each of said guide dowels comprising a hollow, cylindrical guide dowel sleeve sized to be snugly received within an aligned pair of said bores and having first and second ends, a circumferentially-extending groove encircling said guide dowel sleeve intermediate said first and second ends, and a circular abutment member comprising a circular piece of spring steel wire received within said groove and partly projecting radially outwardly of said groove.

5. The kit of claim 4 wherein said spring steel wire extends through an arc of substantially 270°.

6. The mold base kit of claim 4 wherein said groove is located centrally between said first and second ends.

7. A mold base kit comprising plural plates having alignment bores extending therethrough and plural guide dowels, each of said guide dowels comprising a hollow, cylindrical sleeve sized to be snugly received within an aligned pair of said bores and having first and second ends, and an abutment member intermediate said ends extending radially outwardly beyond said sleeve, one end of each of said bores being countersunk to provide a significant chamfered surface leading thereto, so that one of said guide dowels may be lodged in a mutually aligned pair of said bores of two of said plates assembled in face-to-face abutting relation with said abutment member thereof trapped between the mutually confronting chamfered surfaces leading to said aligned bores.

8. A mold base comprising two plates assembled in face-to-face abutting relationship, each of said plates having alignment bores extending therethrough, with said bores of said one of said plates being aligned with said bores of the other of said plates, said plates having mutually confronting, significantly chamfered surfaces at the mutually confronting ends of said bores, and at least one guide dowel located in said alignment bores, said guide dowel comprising a hollow sleeve sized to be snugly received within an aligned pair of said bores and having first and second ends, and an abutment member extending outwardly beyond said dowel.

9. A mold base kit comprising plural rectangular plates, each of said plates having a first face and a second face parallel to said first face, each of said plates having four alignment bores, there being one of said bores adjacent each corner thereof and extending perpendicularly therethrough, each of said bores in all of said plates having the same primary diameter, both faces of each of said plates having a significant circular chamfered surface at both the ends of each of said bores so that any two of said plates may be placed in mutually abutting, face-to-face relationship with their respective said bores in mutual alignment and define hollow pockets bounded by said chamfered surfaces at the confronting ends of said bores, said pockets having a maximum diameter in the plane of the abutting faces which is significantly larger in diameter than the primary diameter of said bores.

10. A generally rectangular plate for use in constructing a mold base, said plate having a first face and a second face parallel to said first face, at least two leader pin-receiving alignment bores adjacent corners of said plate and extending perpendicularly therethrough, each of said bores having the same primary diameter, both faces of said plate having significant circular chamfer surfaces at both ends of each of said bores.

11. The plate of claim 8 wherein said plate has four said alignment bores extending therethrough.

12. A guide dowel for use in constructing a mold base comprising plural plates having leader pin-receiving bores extending therethrough, said guide dowel comprising a hollow sleeve sized to be snugly received within an aligned pair of said bores and having first and second ends, a circumferentially-extending groove encircling said dowel intermediate between said first and second ends, and a circular abutment member comprising a circular piece of spring steel wire received within said groove and partly projecting out of said groove.

13. The guide dowel of claim 12 wherein said spring steel wire extends through an arc of substantially 270°.

14. A guide dowel for use in constructing a mold base comprising plural plates having leader pin-receiving bores extending therethrough, said guide dowel comprising a hollow sleeve sized to be snugly received within an aligned pair of said bores and having first and second ends, a circumferentially-extending groove encircling said dowel centrally between said first and second ends, and a circular abutment member received within said groove and partly projecting out of said groove.

15. The guide dowel of claim 14 wherein said abutment member comprises a circular piece of spring steel wire.

16. The guide dowel of claim 15 wherein said spring steel wire extends through an arc of substantially 270°.

* * * * *

UNITED STATES PATENT AND TRADEMARK OFFICE
CERTIFICATE OF CORRECTION

PATENT NO.     : 5,916,603
DATED          : June 29, 1999
INVENTOR(S)    : Ronald E. Pleasant et al.

It is certified that error appears in the above-identified patent and that said Letters Patent is hereby corrected as shown below:

<u>Column 7,</u>
Line 17, change "8" to -- 10 --

Signed and Sealed this

First Day of April, 2003

JAMES E. ROGAN
*Director of the United States Patent and Trademark Office*